(12) United States Patent
Chancellor

(10) Patent No.: US 6,521,127 B1
(45) Date of Patent: *Feb. 18, 2003

(54) MODULAR FILTRATION SYSTEMS AND METHODS

(75) Inventor: Dennis Chancellor, Woodland Hills, CA (US)

(73) Assignee: Nate International, Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/367,517

(22) PCT Filed: Apr. 13, 1998

(86) PCT No.: PCT/US98/07383

§ 371 (c)(1),
(2), (4) Date: Oct. 29, 1999

(87) PCT Pub. No.: WO98/46338

PCT Pub. Date: Oct. 22, 1998

Related U.S. Application Data

(60) Provisional application No. 60/043,001, filed on Apr. 14, 1997.

(51) Int. Cl.[7] .......................... B01D 63/00; B01D 63/02
(52) U.S. Cl. .............................. 210/321.72; 210/321.8; 210/321.88; 210/257.2; 210/433.1; 210/170; 210/335
(58) Field of Search ................................. 210/641, 652, 210/433.1, 321.6, 336, 456, 321.72, 321.8, 321.88, 257.2, 170, 335

(56) References Cited

U.S. PATENT DOCUMENTS

| | | | | |
|---|---|---|---|---|
| 4,083,780 A | * | 4/1978 | Call | 210/321.74 |
| 4,125,463 A | * | 11/1978 | Chenoweth | 210/460 |
| 4,198,293 A | | 4/1980 | Ogawa et al. | |
| 4,702,842 A | | 10/1987 | Lapierre | 210/651 |
| 5,366,635 A | * | 11/1994 | Watkins | 210/651 |
| 5,470,469 A | | 11/1995 | Eckman | 210/321.8 |
| 5,607,592 A | * | 3/1997 | Bernard et al. | |
| 5,914,041 A | * | 6/1999 | Chancellor | 210/641 |
| 6,004,464 A | * | 12/1999 | Lien | |

* cited by examiner

Primary Examiner—Ana Fortuna
(74) Attorney, Agent, or Firm—Rutan & Tucker, LLP

(57) ABSTRACT

A filtration system includes production modules (305) which are mechanically coupled in series, and which contain filters that are fluidly coupled in parallel. Among the many different possibilities contemplated, each production module may advantageously contain not only a filter (314), but also flowpaths for feed fluid (334a), waste fluid (334b), and product fluid (334c) so that a series of coupled modules can be installed, accessed, and removed as single unit. It is further contemplated that coupled modules may be deployed in space efficient manner, such as by insertion into a deep or shall well, a tower, along the ground, into the side of a hill or mountain, or even under a road or parking lot. It is still further contemplated that adjacent production modules may be designed to mate with one another using a slip fit joint, and that the production modules may be maintained in mating relationship through connections to supporting cables or rods.

12 Claims, 4 Drawing Sheets

MODULAR FILTRATION SYSTEMS AND METHODS

This application claims the benefit of provisional application 60/043,001 filed Apr. 14, 1997.

BACKGROUND

There is a great world-wide demand for purified fluids, one of the most commercially important of which is the production of fresh water from salty or brackish water. Aside from distillation techniques, such demand is commonly satisfied by filtration. There are many types of filtration, including reverse osmosis, ultra-filtration and hyper-filtration, and all such technologies are contemplated herein within the generic term, "filtration."

Most filtration units consists of a can containing a filter, and three flow paths communicating with the outside world. One flow path carries a feed fluid, another flow path carries filtered fluid (i.e., product), and a third flow path carries reject which is sometimes also referred to as waste fluid. In the case of reverse osmosis units used for purifying brackish water, the feed fluid would be the brackish water, the filtered fluid would be desalinated (fresh) water, while the waste fluid would be salty water.

Filtration plants generally include a multitude of physically separate filtration units disposed on or near ground level. The feed, filtered and waste fluids are carried by three separate pipes, respectively, and each filtration unit is fluidly coupled to each of the pipes using a hose or other line. In such embodiments, the entire system is modularized, with the various filtration units comprising the modules. The various modules are mechanically disposed more or less in parallel, and the various membranes are fluidly disposed in parallel. There are many advantages to such an arrangement, not the least of which is that individual modules can be disconnected from the system for service, while the remainder of the system is unaffected.

U.S. Pat. No. 4,125,463 to Chenoweth follows this same strategy, except that his various reverse osmosis modules (called permeator assemblies) are disposed in sets of five about a common riser pipe. This adaptation allows for hundreds of modules to fit conveniently within a single well casing. Here again, however, there is no teaching or suggestion of any sort of super-module which could encompass sets of five RO modules, and which could be arranged serially.

Still other disclosures suggest the creation of a deep underwater housing for containing filtration modules. Once again, the modules are contemplated to be physically disposed more or less in parallel, while the filters are contemplated to be fluidly disposed in parallel.

The known arrangements of modules are not, however, without their limitations. Positioning of modules in parallel requires considerable space, and when placed on land in a commercial embodiment often requires a relatively large "footprint." The Chenoweth type concept of using a deep well makes relatively good use of space, but is impractical because of the vast number of interconnections required.

SUMMARY OF THE INVENTION

In the present invention apparatus and methods are provided in which filter containing production modules are mechanically coupled in series, while the filters contained in the production modules are fluidly coupled with the feed, filtered and waste fluid flowpaths in parallel.

Among the many different possibilities contemplated, each production module may advantageously contain not only a filter, but all three flowpaths, so that a series of coupled modules can be installed, accessed, and removed as a single unit. It is further contemplated that coupled modules may be deployed in space efficient manner, such as by insertion into a deep or shall well, a tower, along the ground, into the side of a hill or mountain, or even under a road or parking lot. It is still ether contemplated that adjacent production modules may be designed to mate with one another using a slip fit joint, and that the production modules may be maintained in mating relationship through connections to supporting cables or rods.

BRIEF DESCRIPTION OF THE DRAWING

Various objects, features, aspects and advantages of the present invention will become more apparent from the following detailed description of preferred embodiments, in conjunction with the accompanying drawings, wherein like numerals represent like components.

DETAILED DESCRIPTION

Figure 1:
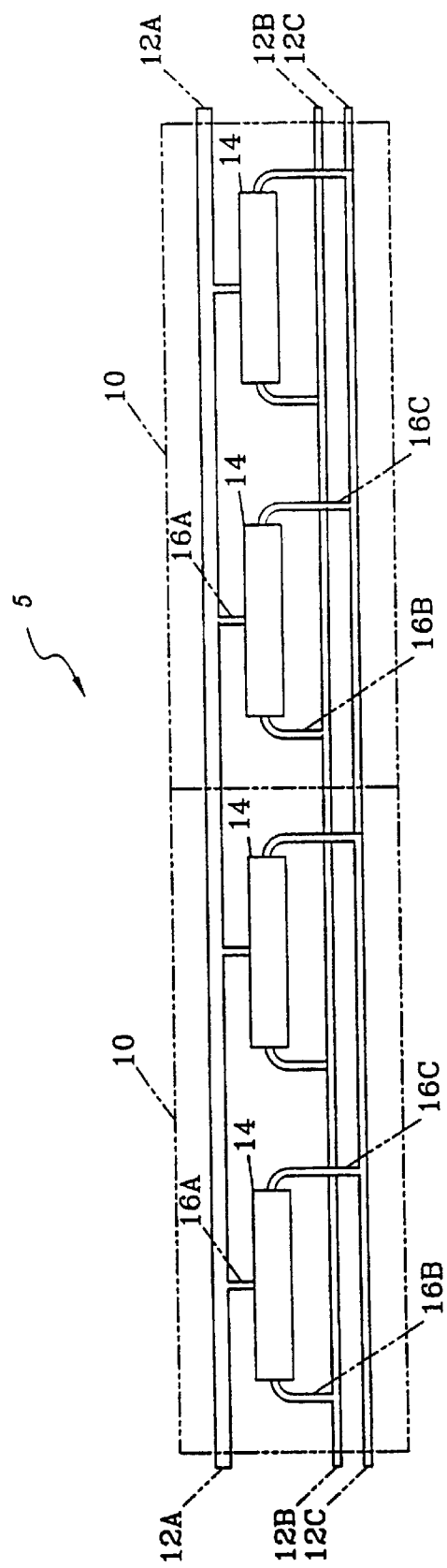
FIG. 1 is a exploded schematic of a filtration system according to the present invention.

In FIG. 1 a filtration system 5 generally comprises a plurality of production modules 10 butted end to end. Each module 10 includes three lines, a feed line 12A, a waste line 12B and a product line 12C. The various lines are fluidly coupled to filters 14 via shunts 16A, 16B and 16C, respectively. In general, feed fluid flows through lines 12A and 16A to filter 14, which separates out waste and product streams. The waste flows through line 16B and into line 12B, while the product flows through line 16C and into line 12C. The lines 12A, 12B and 12C are coupled from module to module so that each type of fluid flows through all the modules in the series.

Figure 2:
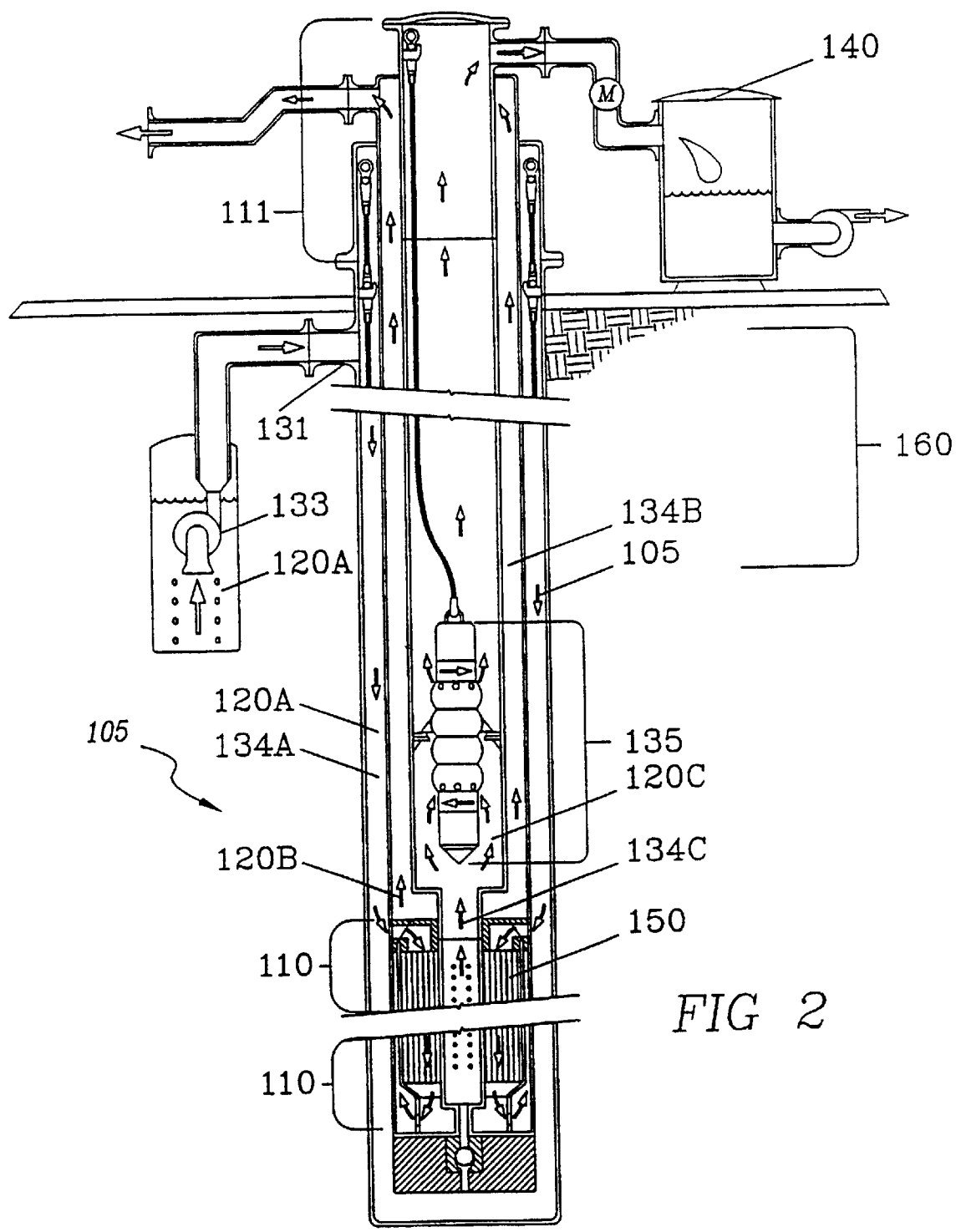
FIG. 2 is a schematic of a preferred embodiment of a well-based filtration system according to the present invention.

In FIG. 2 system 105 is seen to include other modules and connections useful for a preferred embodiment Here, feed water 120A such as salty or brackish water is drawn by pump 133 up through a supply line 131 into a well-based reverse osmosis production plant. Feed water 120A then flows downward along flowpath 134A to filter 150 in module 110, which separates out fresh water product 120C from waste water 120B. The fresh water product 120C flows upward in flowpath 134C to holding tank 140, assisted by pump 135. Waste water 120B flows upward in waste water flowpath 134B, and is discharged from the system 5 via line 150. In this manner, the various modules 110 are mechanically connected in series, while the fluid filters 150 are connected in parallel, relative to the fluid flowpaths 134A, 134B, and 134C.

Also illustrated in FIG. 2 are a headworks 111 and a transition module 160 which transitions between the pump or production modules and the surface. It is still further contemplated that adjacent production nodules 100 may be designed to mate with one another using a slip fit joint (not shown), and that the production modules may be maintained in mating relationship through connections to supporting cables or rods.

Figure 3:
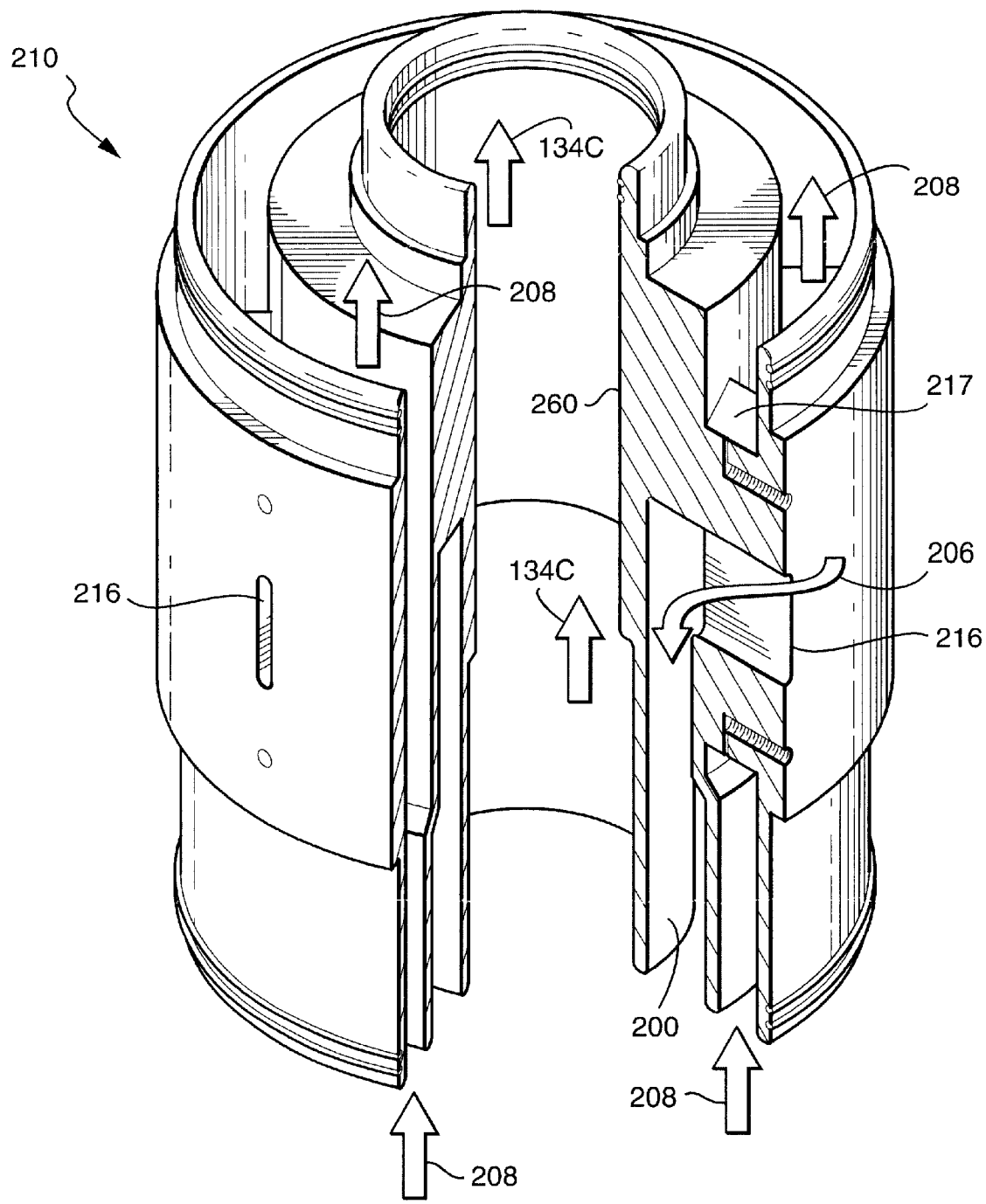
FIG. 3 is a three-dimensional partial cutaway of a manifold of a production module according to the present invention.

FIG. 3 illustrates a manifold 210 which may be placed at one end of a production module to mate both the adjacent modules and to mate the various flowpaths. Among other things, manifold 210 defines several channels 216 through which a feed fluid passes (see arrow 206) from a feed fluid supply space 134A (see FIG. 2) to an internal flow space 200, before flowing onto a filter (not shown). The various channels 216 are formed within ribs 217, which also serve to support a pipe 260 defining the product flowpath. As will be readily appreciated, the waste fluid flowing past the filter(s) in module 210 flows in the direction of arrow 208, and thence along path 134C (see FIG. 2).

Figure 4:
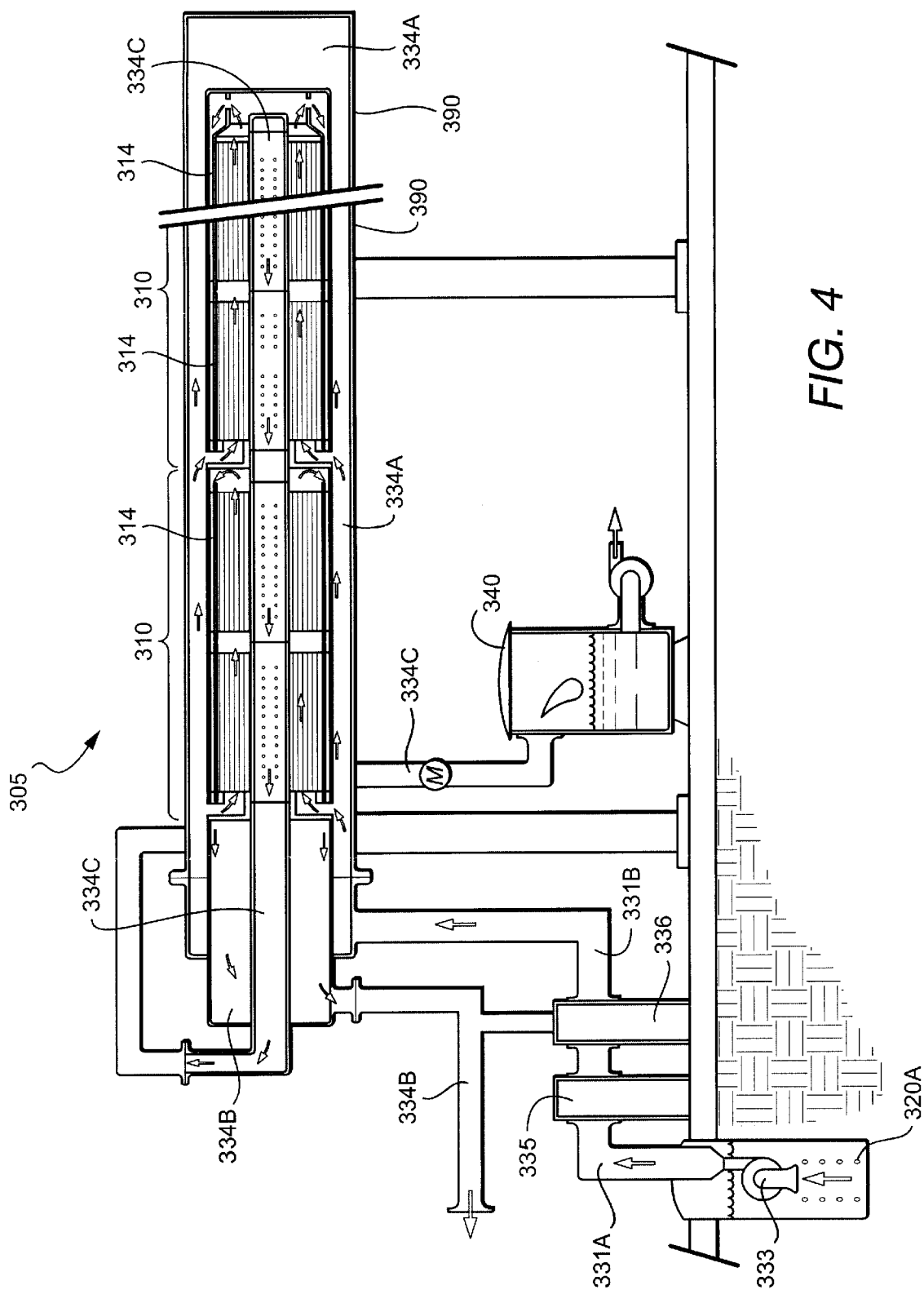
FIG. 4 is a schematic of a preferred embodiment of an above-ground filtration system according to the present invention.

In FIG. 4 system 305 illustrates an above-ground embodiment generally in which feed water 320A is drawn by pump 333 up through a supply line 331 into a prefilter 335 and a work exchange pump 336. Feed water 320A then passes through supply line 331B to two production units 310 via feed fluid flowpath 334A. Once inside production units 310, some of the feed fluid 320A passes through the filters 314 to form product 320C, which is collected in product flowpath 334C. Product 320C then flows by gravity to holding tank 340. The fluid which fails to pass through filters 314 becomes waste fluid 320B, and is carried along flowpath 334C, and is expelled from the system. Thus, in this embodiment, as in the embodiment of FIG. 2, sections of one of the flowpaths (here, the feed fluid flowpath 334A) is disposed between the modules 310 and an outer casing 390. Of course, other embodiments are also contemplated in which sections of one or more different flowpaths are included within the modules 310.

A system as in FIG. 4 is contemplated to preferably include anywhere from two to 50 or more production units 310, with each production unit preferably ranging from about 10 feet to about 20 feet in length. The outer casing is preferably about 30 inches in diameter, but may advantageously have greater or lesser diameters, and may, in fact, have cross-sections other than round. Based upon existing filters, such a system is expected to produce about 2 million gallons of fresh water or other product fluid per day.

Additional details of preferred systems which may be applicable to the present inventive subject matter were disclosed in WO 98/09718, which is incorporated herein in its entirety. Such details relate to favored types of pumps, favored dimensions of modules, favored orientations and placements of the system, favored filters, and so forth. Particularly contemplated are embodiments in which the pressure needed to operate the filters is substantially provided by a pump or a column of liquid. Positive displacement pumps are favored for this purpose, especially where such pumps are incorporated into work exchange units. Columns of feed fluid are also favored, especially where the column is at least 200 feet deep, more preferably at least 500 feet deep, still more preferably at least 1000 feet deep, and still more preferably at least 1500 feet deep.

There are, of course, innumerable other modifications which can be made that still fall within the general concept set forth herein. For example, In FIG. 1, all three fluid lines 12A, 12B and 12C are shown as contained entirely within the production modules 10. In alternative embodiments, however, any one, any two, or all three fluid lines can be disposed outside the production modules 10. FIG. 2 is a case in point, since the feed fluid 120A flows in flowpath 134A outside the modules 110, i.e., between the modules 110 and the well casing. In other modifications, filtration systems according to the inventive subject matter can be located in a great variety of configurations and dispositions. For example, systems may be configured as a single long tube, as a "farm" of short tubes, or even in a curve or circle. Also, systems may be placed above ground, below ground, partly above and partly below ground, vertically, horizontally, and at any angle in between.

It should also be appreciated that the feed, waste and product fluids can vary from system to system, and should be considered in the most general sense. For example, feed fluid may be contaminated with nothing more than a very small amount of common salt, or it may be heavily contaminated with all manner of organic, inorganic, dissolved or suspended solids. Similarly, waste fluid in a desalination system may not be entirely waste, but may be fed to a secondary filtration system using higher pressure. Still further, with respect to filtration of dietary fluids, such as orange juice, the waste fluid may have considerable commercial value as animal feed or fertilizer. Along the same lines, the product fluid need not be especially pure. Pureness is relative, and some systems may be utilized that produce water or other fluids which are not generally considered potable.

Thus, modular filtrations systems have been disclosed in which modules are mechanically coupled in series, while the filters are fluidly coupled in parallel. While specific embodiments and applications have been shown and described, it would be apparent to those skilled in the art that many more modifications are possible without departing from the inventive concepts herein. The invention, therefore, is not to be restricted except in the spirit of the appended claims.

What is claimed is:

1. A modular filtration system, comprising:
   a feed fluid flowpath, a waste fluid flowpath, and a product flowpath, wherein the feed fluid flowpath, the waste fluid flowpath and the product flowpath comprise a channel or conduit;
   a plurality of production modules, each including a filter which separates a first fluid in the feed fluid flowpath into a second fluid in the waste fluid flowpath and a third fluid in the product fluid flowpath;
   the production modules disposed within an outer casing, in which adjacent production modules are mechanically coupled in series and fluidly coupled in parallel relative to the waste fluid and product flowpaths;
   the feed fluid flowpath, the waste fluid flowpath and the product fluid flowpath substantially parallel to one another throughout the length of each of the production modules; and
   a substantial amount of the feed fluid bypassing at least one of the production modules.

2. The system of claim 1 wherein the production modules each contain a section of each of the feed fluid, waste fluid, and product flowpaths.

3. The system of claim 1 wherein the production modules each contain a section of at least two of the feed fluid, waste fluid, and product flowpaths.

4. The system of claim 1 wherein the production modules each contain a section of at least one of the feed fluid, waste fluid, and product flowpaths.

5. The system of claim 1, wherein the outer casing is supported by a support above ground level.

6. The system of claim 1, wherein the the casing is at least partially disposed in a well.

7. The system of claim 1 wherein the filters are reverse osmosis membranes.

8. The system of any of claims 1–7 further comprising a pump which pressurizes the feed fluid flowpath.

9. The system of any of claims 1–7 further comprising a work exchange unit which pressurizes the feed fluid flowpath.

10. The system of any of claims 1–7 further comprising a fluid column which pressurizes the feed fluid flowpath.

11. The system of claim 1, wherein the substantial amount of the feed fluid bypasses between an outer wall of he production module and a well casing.

12. The system of claim 1, wherein at least one of the production modules is not sealed at the outer casing.

* * * * *